June 21, 1938. H. BÉNIT Re. 20,766

LEAD SHEATHED CABLE AND METHOD OF PROTECTING THE LEAD AGAINST CORROSION

Original Filed May 7, 1930

Inventor:
Henri Benit
by Edward H. Palmer
Atty.

Reissued June 21, 1938

Re. 20,766

UNITED STATES PATENT OFFICE 20,766

LEAD SHEATHED CABLE AND METHOD OF PROTECTING THE LEAD AGAINST CORROSION

Henri Bénit, Paris, France, assignor to Compagnie Generale D'Electricite, Paris, France Original No. 1,944,778, dated January 23, 1934, Serial No. 535,810, May 7, 1931. In Germany May 7, 1930. Application for reissue November 26, 1934, Serial No. 754,906

7 Claims. (Cl. 173—266)

Figure 1:
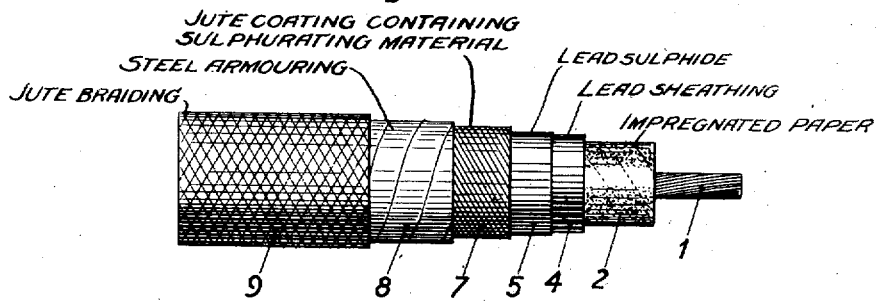

The corrosion of lead employed in the form of pipes or tubes and for sheathing electric cables exposed to the weather or buried in the soil or embedded in cement is well known.

In general, in order to prevent corrosion the lead is separated from the surrounding medium by covering it with a protective coating generally constituted by one or more layers of pitch or of tar, the coating being maintained and protected mechanically by a covering of jute or canvas.

It is found in practice that such waterproof coatings do not always remain wholly impermeable, cracks are produced eventually in the layer of protective coating and infiltration of moisture in the presence of air produces corrosion of the lead.

Moreover the substance used to form the protective coating should not itself contain products which are corrosive of lead or which become so in the presence of other chemical agents contained in the soil; otherwise the lead will be destroyed eventually. It is thus necessary to employ a perfectly neutral protective coating which is much more costly in general than ordinary tars and the neutrality of which is often difficult to verify.

The process forming the subject of the present invention avoids the above mentioned disadvantages. It consists in rendering the lead unattackable by destructive agents by creating on its surface, chemically, a protective layer formed by a very stable lead salt which resists chemical changes. The lead salt thus produced will form a very thin layer protected mechanically by the usual covering which might now be of ordinary tar or other inexpensive material which will not be chemically neutral. There will no longer be any liability of corrosion of the lead in case of cracking of the waterproof covering even if corrosive products are present in this coating because the lead salt formed on the surface of the lead will prevent attack by the latter.

The lead salt which forms the protective layer should be very stable and be easily and cheaply formed. Lead sulphide fulfills these conditions; it is insoluble in water and is unattackable or almost unattackable by acids and mineral and organic salts. It is formed easily from pure sulphur or from natural or artificial sulphide derivatives in contact with lead, the reaction being very rapid with the aid of heat.

In accordance with the invention the protective layer is formed preferably by lead sulphide obtained simply by introducing an excess of sulphur into the substance intended to serve as the protective covering either in the form of pure sulphur which dissolves well in tar or pitch or in the form of natural or artificial sulphide derivatives.

For example, there may be applied to the lead directly at a temperature a little above 100° C. a layer of ordinary tar mixed with pure sulphur in a proportion greater than 3%. Under these conditions there will be formed instantaneously on the lead a film-like coating of lead sulphide and the reaction will cease of its own accord leaving an excess of sulphur in the tar.

The advantages of the process forming the subject of the invention are the following:

The superficial layer of lead sulphide protects the lead against the action of phenols, cresols and other destructive agents contained in tar or in the protective covering employed, or which may be formed even in the presence of other chemical agents in the soil. The lead sulphide which covers the surface of the lead protects the lead even in the case where the waterproof covering round the pipe or the lead sheathing is not completely impermeable to water. The lead sulphide even altered by oxidation continues to protect the lead by being converted into sulphate which is equally insoluble or very slightly soluble in water.

The excess of sulphur contained in the layer of tar continues to protect the lead by acting as a sulphidizing medium or as a sulphatizing medium after oxidation. This is important as it might happen that the first protective coating of sulphide would be impaired and the lead would be exposed. Under these conditions there would still exist along the lead tube the sulphidizing and sulphatizing protective medium. On the other hand, the constant emission of sulphuric acid would oppose the dissolving action which certain ammoniacal organic salts which are found in the soil (acetates, tartrates of ammonia etc.) exert on the sulphate of lead.

Where the protective covering for the lead consists of concrete or cement another form of the invention consists in incorporating in the cement during the preparation of the mortar a small proportion of sodium sulphide. It will be understood, from what has been stated above, that the lead will thus be protected against attack of the most highly basic cements. This form of the invention is susceptible of very important applications because it permits of avoiding the corrosion of the lead in the very frequent instances where lead pipes pass through walls or masonry or when electric cables covered with lead sheathing are laid on shelves of cement in galleries or in sewers.

The process forming the subject of the present invention permits also of protecting the lead from electrolytic corrosion or at least of reducing greatly the destructive effects of electrolysis by retarding the speed of the reaction in the ratio of about 10:1 under the same conditions. In fact the oxygen liberated by electrolysis transforms the sulphide of lead into the sulphate which continues to protect the lead. In the presence of an excess of sulphur in the tar sulphuric acid will be formed which will assist to maintain the protective medium in contact with the lead in the sulphidizing and sulphatizing state.

The annexed drawing shows two embodiments of the subject of the invention.

Fig. 1 shows a lead covered single conductor armoured cable, and

Figure 2:
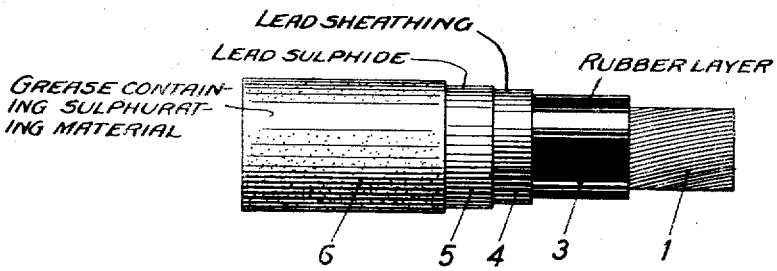

Fig. 2 a low tension lead covered single conductor cable.

In these figures, 1 indicates the conductor which is insulated by a layer of impregnated paper 2 or a layer of rubber 3, these insulating layers being protected by the lead sheathing 4. In accordance with the invention this lead sheathing is protected against corrosion by the thin layer or film of lead sulphide 5 (for convenience, shown relatively thick on the drawing). This protected lead sheathing may as shown in Fig. 1 be covered over by a coating 7 of jute or canvas impregnated with pitch or tar containing the sulphurating material and this coating may further be protected by a steel armouring 8 and a final impregnated jute braiding 9. In the case of Fig. 2 which shows a cable which may be passed through walls or masonry, disposed in galleries or in sewers, or drawn through concrete ducts, the surface of the film protected lead sheathing is smeared over with a grease 6 containing the sulphurating material.

It is evident that the subject of the invention may be applied to polyphase cables containing a plurality of conductors, each conductor being provided with an independent insulation.

Having now particularly described and ascertained the nature of my said invention and in what manner the same is to be performed, I declare that what I claim is:

1. In a method of preventing corrosion of the lead sheathing of electric cables wherein the lead sheathing is protected against mechanical deterioration by a layer of a suitable covering material not chemically neutral and not adapted to protect the lead against corrosion, incorporating sulphur to the said protective materials in such quantity that on contact of the lead with these materials a film of lead sulphide will be immediately formed thereon and there will remain in the said protective materials an excess of sulphurating material constantly active to renew any worn portion of the said lead sulphide film, and so prevent the destructive effects of electrolytic phenomena on the lead.

2. In a method of preventing corrosion of the lead sheathing of electric cables wherein the lead sheathing is protected against mechanical deterioration by a layer of a suitable covering material not chemically neutral and not adapted to protect the lead against corrosion, incorporating to the said protective materials quantities of sulphur derivatives having a sulphurating action on lead such that on contact of the lead with these materials there will be immediately formed on the lead a film of lead sulphide and there will still remain in the said protective materials an excess of sulphurating material active to constantly renew any worn portion of the said lead sulphide film, and so prevent the destructive effects of electrolytic phenomena on the lead.

3. In a method of preventing corrosion of the lead sheathing of electric cables wherein the lead sheathing is protected against mechanical deterioration by a layer of a suitable covering material not chemically neutral and not adapted to protect the lead against corrosion, incorporating to the said protective materials a quantity of sodium sulphide such that on contact of the lead with these materials a film of lead sulphide will be immediately formed on the lead sheathing and there will still remain in the said protective materials an excess of sulphurating material constantly active to renew any worn portion of the said lead sulphide film, and so prevent the destructive effects of electrolytic phenomena on the lead.

4. An electric cable comprising insulated electric conductors, a lead sheathing surrounding the said insulated conductors, said lead sheathing being surrounded by a film of lead sulphide and this film being surrounded by a layer of a suitable covering material containing an excess of free sodium sulphide.

5. An electric cable comprising insulated electric conductors, a lead sheathing surrounding the said insulated conductors, said lead sheathing being surrounded by a film of lead sulphide and this film being surrounded by a protective layer of permeable covering material itself incapable of protecting said lead sheathing from chemical action and containing an excess of sulphurating material to prevent destructive effects of electrolysis on the lead.

6. An electric cable comprising insulated electric conductors, a lead sheathing surrounding the said insulated conductors, said lead sheathing being surrounded by a film of lead sulphide and this film being surrounded by a protective layer of permeable covering material itself incapable of protecting said lead sheathing from chemical action and containing an excess of sulphur to prevent destructive effects of electrolysis on the lead.

7. An electric cable comprising insulated electric conductors, a lead sheathing surrounding the said insulated conductors, said lead sheathing being surrounded by a film of lead sulphide and this film being surrounded by a protective layer of permeable covering material itself incapable of protecting said sheathing from chemical action and containing an excess of sulphur derivatives to prevent destructive effects of electrolysis on the lead.

HENRI BÉNIT.